US012573667B2

(12) United States Patent
Ota et al.

(10) Patent No.: US 12,573,667 B2
(45) Date of Patent: Mar. 10, 2026

(54) NON-AQUEOUS ELECTROLYTE SECONDARY BATTERY

(71) Applicant: SANYO Electric Co., Ltd., Kadoma (JP)

(72) Inventors: Masato Ota, Hyogo (JP); Takashi Hosokawa, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 402 days.

(21) Appl. No.: 17/797,367

(22) PCT Filed: Feb. 8, 2021

(86) PCT No.: PCT/JP2021/004630
§ 371 (c)(1),
(2) Date: Aug. 3, 2022

(87) PCT Pub. No.: WO2021/192666
PCT Pub. Date: Sep. 30, 2021

(65) Prior Publication Data
US 2023/0055580 A1 Feb. 23, 2023

(30) Foreign Application Priority Data
Mar. 26, 2020 (JP) ................................. 2020-055461

(51) Int. Cl.
*H01M 10/0587* (2010.01)
*H01M 4/13* (2010.01)
(Continued)

(52) U.S. Cl.
CPC ......... *H01M 10/0587* (2013.01); *H01M 4/13* (2013.01); *H01M 50/188* (2021.01); *H01M 50/531* (2021.01)

(58) Field of Classification Search
CPC .......... H01M 10/0587; H01M 50/531; H01M 2004/021; H01M 2004/028; H01M 4/13
See application file for complete search history.

(56) References Cited

U.S. PATENT DOCUMENTS

2011/0244314 A1 10/2011 Lee et al.
2012/0251874 A1 10/2012 Guen
(Continued)

FOREIGN PATENT DOCUMENTS

CA 2281739 C * 5/2004 ........ H01M 10/0525
CN 102255103 A 11/2011
(Continued)

OTHER PUBLICATIONS

International Search Report dated Apr. 27, 2021, issued in counterpart Application No. PCT/JP2021/004630, with English Translation. (6 pages).
(Continued)

*Primary Examiner* — Kevin E Yoon
(74) *Attorney, Agent, or Firm* — WHDA, LLP

(57) ABSTRACT
A non-aqueous electrolyte secondary battery includes an electrode body including a positive electrode plate and a negative electrode plate, a rectangular exterior body having an opening and accommodating the electrode body, a sealing plate sealing the opening, and an electrode terminal provided to the sealing plate. The positive electrode plate includes a positive electrode core and a positive electrode active material applied to both surfaces of the positive electrode core. The peripheral length of a positive electrode core portion to which the positive electrode active material is applied is 0.28 m/Ah or less per unit battery capacity.

6 Claims, 10 Drawing Sheets

(51) Int. Cl.
  H01M 50/188 (2021.01)
  H01M 50/531 (2021.01)

(56) References Cited

U.S. PATENT DOCUMENTS

| | | | |
|---|---|---|---|
| 2014/0106205 A1 | 4/2014 | Lee et al. | |
| 2018/0226653 A1 | 8/2018 | Yamamoto et al. | |
| 2018/0277880 A1* | 9/2018 | Hosokawa | H01M 50/209 |
| 2019/0006717 A1* | 1/2019 | Wakimoto | H01M 50/188 |
| 2020/0303782 A1 | 9/2020 | Yatomi | |
| 2020/0373626 A1 | 11/2020 | Imanishi et al. | |

FOREIGN PATENT DOCUMENTS

| | | | |
|---|---|---|---|
| CN | 102738428 A | 10/2012 | |
| CN | 108400276 A | 8/2018 | |
| JP | H10-270016 A | 10/1998 | |
| JP | 2008-192524 A | 8/2008 | |
| JP | 2012-43752 A | 3/2012 | |
| JP | 2014-010970 A | 1/2014 | |
| JP | 2017050069 A * | 3/2017 | |
| JP | 2019009015 A * | 1/2019 | H01M 50/583 |
| JP | 2019-160587 A | 9/2019 | |
| WO | 2017/163932 A1 | 9/2017 | |
| WO | WO-2018021214 A1 * | 2/2018 | H01M 4/04 |
| WO | 2019/111742 A1 | 6/2019 | |
| WO | 2019/204359 A1 | 10/2019 | |

OTHER PUBLICATIONS

English Machine Translation of JP2008-192524A (original language document and its abstract previously cited and filed on Aug. 9, 2022); Cited in JP Office Action dated Oct. 8, 2024. (22 pages).
Extended (Supplementary) European Search Report dated Jun. 21, 2024, issued in counterpart EP application No. 21776219.4. (8 pages).
Hearing Notice dated Oct. 22, 2025, issued in counterpart IN Application No. 202247059698, with English translation. (3 pages).

* cited by examiner

FIG.3

NON-AQUEOUS ELECTROLYTE SECONDARY BATTERY

TECHNICAL FIELD

The present disclosure relates to a non-aqueous electrolyte secondary battery.

BACKGROUND ART

A non-aqueous electrolyte secondary battery such as a lithium ion battery has a structure in which an electrode body is accommodated in an exterior body having an opening and the opening is sealed with a sealing plate. The electrode body has a structure in which a positive electrode and a negative electrode are stacked with a separator interposed therebetween.

In recent years, demand for on-vehicle lithium ion batteries has been increasing. On-vehicle lithium ion batteries, especially lithium ion batteries for EVs, are required to have various characteristics such as a high capacity, compatibility with quick charging, a high capacity, compatibility with quick charging, a high capacity recovery rate, and a high degree of safety. For example, when the vehicle is stored without being driven for a certain amount of time after charging the lithium ion battery, the battery capacity decreases. It is thus necessary to improve the characteristic to prevent or reduce this capacity decrease.

CITATION LIST

Patent Documents

PATENT DOCUMENT 1: Japanese Unexamined Patent Publication No. 2019-160587
PATENT DOCUMENT 2: Japanese Unexamined Patent Publication No. 2012-43752

SUMMARY OF THE INVENTION

To address the battery capacity decrease due to a long-term storage, improvement measures have been taken in the past in light of materials. However, with an increase in performance of lithium ion batteries for EVs, further improvement in the characteristic has been required.

A non-aqueous electrolyte secondary battery of the present disclosure includes an electrode body including a positive electrode plate and a negative electrode plate, a rectangular exterior body having an opening and accommodating the electrode body, a sealing plate sealing the opening, and an electrode terminal provided to the sealing plate. The positive electrode plate includes a positive electrode core and a positive electrode active material applied to at least one surface of the positive electrode core. The peripheral length of a positive electrode core portion to which the positive electrode active material is applied is 0.28 m/Ah or less per unit battery capacity. The peripheral length of the positive electrode core portion to which the positive electrode active material is applied is 0.11 m/Ah or less per unit battery capacity in a more-preferred embodiment.

When the positive electrode active material is applied to both surfaces of the positive electrode core, the peripheral length of the positive electrode core portion to which the positive electrode active material is applied means the total of the peripheral lengths of the positive electrode core portions on both surface sides.

The electrode body has a shape in which the positive electrode plate and the negative electrode plate are wound to face each other.

The negative electrode plate includes a negative electrode core and a negative electrode active material applied to the negative electrode core, the positive electrode plate and the negative electrode plate in the electrode body are stacked with a separator interposed therebetween, and The area of a portion, which faces the portion to which the positive electrode active material is applied, of a negative electrode plate portion to which the negative electrode active material is applied is 85% or more to 95% or less of the entire area of the portion to which the negative electrode active material is applied.

The electrode body include one or more electrode bodies, and the capacity of each electrode body is 30 Ah or more.

A battery capacity per unit area of the positive electrode core portion to which the positive electrode active material is applied is 40 Ah/m² or more. When the positive electrode active material is applied to both surfaces of the positive electrode core, the area of the positive electrode core portion to which the positive electrode active material is applied means the total of the areas of the positive electrode core portions on both surface sides.

In a preferred embodiment, the non-aqueous electrolyte secondary battery further includes a first current collector disposed between the electrode body and the sealing plate and connected to the electrode terminal, a second current collector disposed between the electrode body and a side wall of the rectangular exterior body and connected to the first current collector, and a tab group extending from the electrode body toward the side wall and connected to the second current collector; the second current collector is made of a flat plate having a surface parallel to the side wall; and the tab group includes a positive electrode tab group with a bundle of multiple positive electrode tabs extending from the positive electrode plate and a negative electrode tab group with a bundle of multiple negative electrode tabs extending from the negative electrode plate, and is bent on a side close to a connection with the second current collector to be parallel to the side wall.

In the non-aqueous electrolyte secondary battery of the present disclosure, the peripheral length of the portion to which the positive electrode active material is applied is 0.28 m/Ah or less per unit battery capacity. Thus, the percentage of lithium ions dispersed in the region of the negative electrode plate not facing the positive electrode plate during storage with respect to lithium ions present in the region of the negative electrode plate facing the positive electrode plate after charging can be decreased. Accordingly, a battery capacity recovery rate can be increased.

BRIEF DESCRIPTION OF THE DRAWINGS

FIG. 3 is a view showing a second current collector according to the embodiment of the present disclosure.

DESCRIPTION OF EMBODIMENTS

Figures 1, 2:
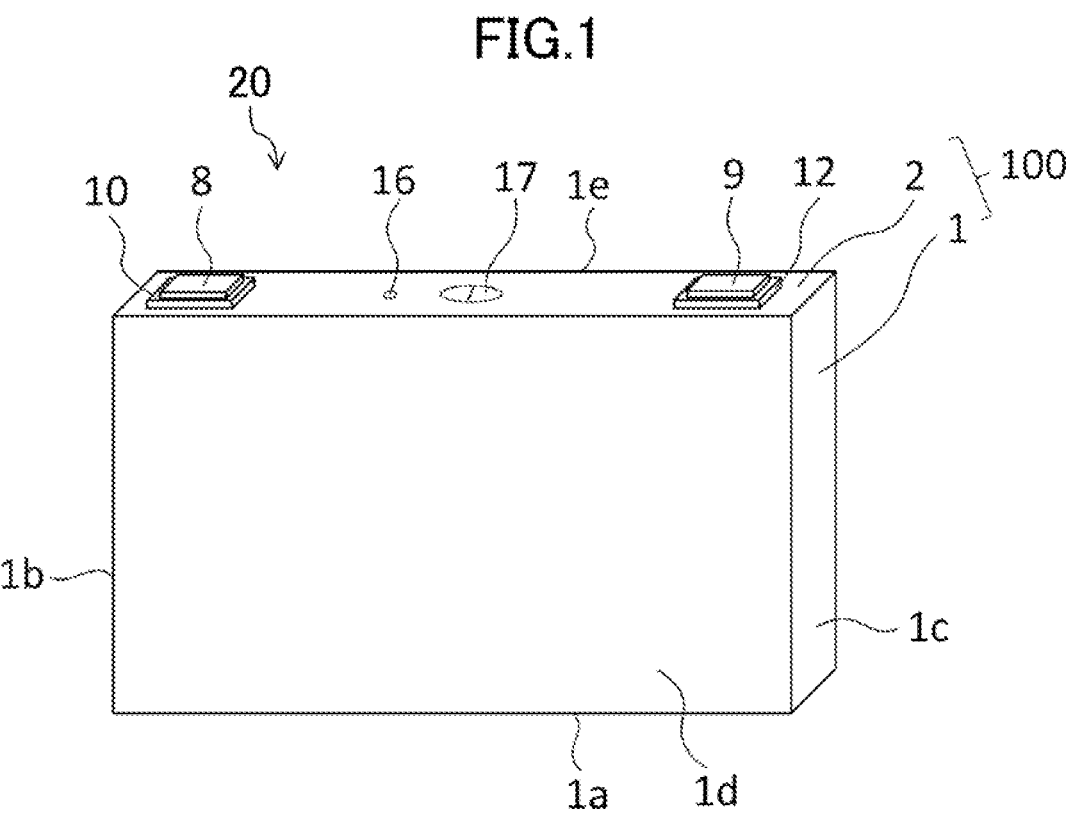
FIG. 1 is a perspective view of a non-aqueous electrolyte secondary battery according to an embodiment of the present disclosure.
FIG. 2 is a sectional view of the battery of FIG. 1.

Embodiments of the present disclosure are described below in detail with reference to the drawings. The following description of advantageous embodiments is a mere example in nature, and is not at all intended to limit the scope, application, or use of the present disclosure. For the sake of simple description, constituting elements having substantially the same functions are given the same reference characters in the following drawings.

<Overall Configuration of Battery>

FIG. 1 is a perspective view of a non-aqueous electrolyte secondary battery according to the present disclosure. FIG. 2 is a sectional view of the battery of FIG. 1, taken along a line parallel to the plane of paper. As shown in FIGS. 1 and 2, a non-aqueous electrolyte secondary battery 20 includes a battery case 100 having a rectangular exterior body 1 having an opening and a bottomed rectangular tube shape and a sealing plate 2 sealing the opening of the rectangular exterior body 1.

The rectangular exterior body 1 has a bottom 1a, a pair of first side walls 1b and 1c, and a pair of second side walls 1d and 1e. The first side walls 1b and 1c in pair are disposed to face each other. The second side walls 1d and 1e in pair are disposed to face each other. The pair of first side walls 1b and 1c is perpendicular to the longitudinal direction of the sealing plate 2, and the area of the pair of first side walls 1b and 1c is smaller than that of the pair of second side walls 1d and 1e.

In the rectangular exterior body 1, an electrode body 3 including a positive electrode plate 4 and a negative electrode plate 5 is accommodated together with an electrolyte. In the present embodiment, the electrode body 3 is a flat electrode body in which the positive electrode plate 4 and the negative electrode plate 5 are wound with a separator interposed therebetween. The winding axis of the electrode body 3 extends perpendicularly to the first side walls 1b and 1c and parallel to the second side walls 1d and 1e. The electrode body 3 is not limited to the wound electrode body, and may be, for example, a stacked electrode body in which multiple positive electrode plates 4 and multiple negative electrode plates 5 are stacked with separators interposed therebetween.

In FIG. 2, reference numeral 10 denotes an external insulating member disposed between the sealing plate 2 and a positive electrode terminal 8, and reference numeral 12 denotes an external insulating member disposed between the sealing plate 2 and a negative electrode terminal 9. Reference numeral 11 denotes an inner insulating member disposed between the sealing plate 2 and a first positive electrode current collector 61, and reference numeral 13 denotes an inner insulating member disposed between the sealing plate 2 and a first negative electrode current collector 71. Reference numeral 14 denotes a box-shaped or bag-shaped insulating sheet which is disposed inside the rectangular exterior body 1 and accommodates the electrode body 3. Reference numeral 15 denotes an electrolyte injection hole provided in the sealing plate 2. Reference numeral 16 denotes a sealing member sealing the electrolyte injection hole 15. Reference numeral 17 denotes a gas discharge valve provided in the sealing plate 2.

In the non-aqueous electrolyte secondary battery 20, one side is a positive electrode side and the other side is a negative electrode side in a direction in which the winding axis of the electrode body 3 extends. The positive electrode side is mainly described below, and description of the negative electrode side may be omitted.

<Configuration of Electrode Body>

Figure 4:
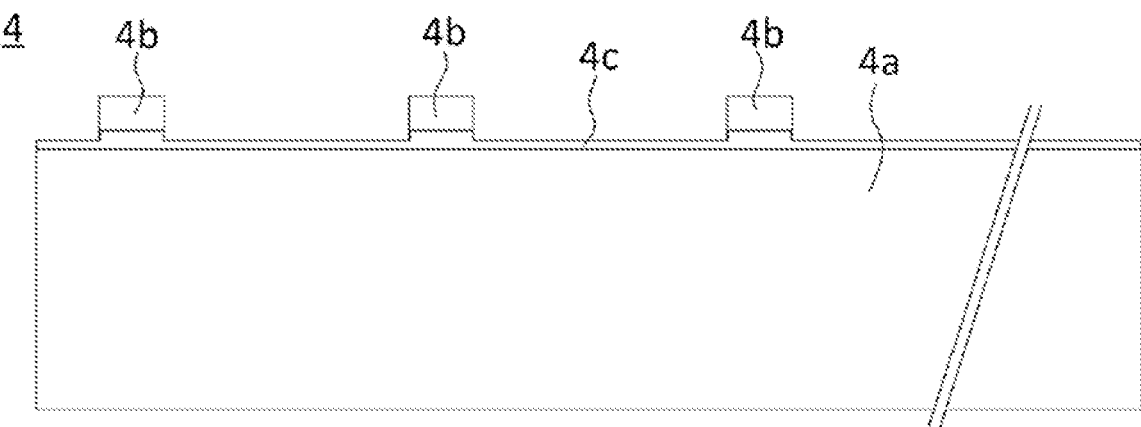
FIG. 4 is a plan view of a positive electrode plate according to the embodiment of the present disclosure.

As shown in FIG. 4, the positive electrode plate 4 has a long strip-like shape, and has a region in which a positive electrode active material layer 4a is formed on each surface of a positive electrode core (e.g., an aluminum foil). Multiple positive electrode tabs 4b extend in a raised shape from one end of the positive electrode core in the lateral direction of the positive electrode plate 4. The surface of the positive electrode core on and near the one end in the lateral direction of the positive electrode plate 4 is covered with a protective layer 4c. In other words, the protective layer 4c is provided with a constant width from one side (end) extending in the longitudinal direction of the positive electrode plate 4 toward the longitudinal center axis of the positive electrode plate 4. The protective layer is also provided at the base of each positive electrode tab 4b. The protective layer 4c contains an insulant, and may be, for example, an insulating layer made of resin or a layer containing ceramic, which is an inorganic oxide, and a resin binder. The protective layer 4c can be, for example, a layer containing an alumina powder, a carbon material as an electroconductive material, and polyvinylidene fluoride as a binder. The protective layer 4c is not necessarily provided.

Figure 5:
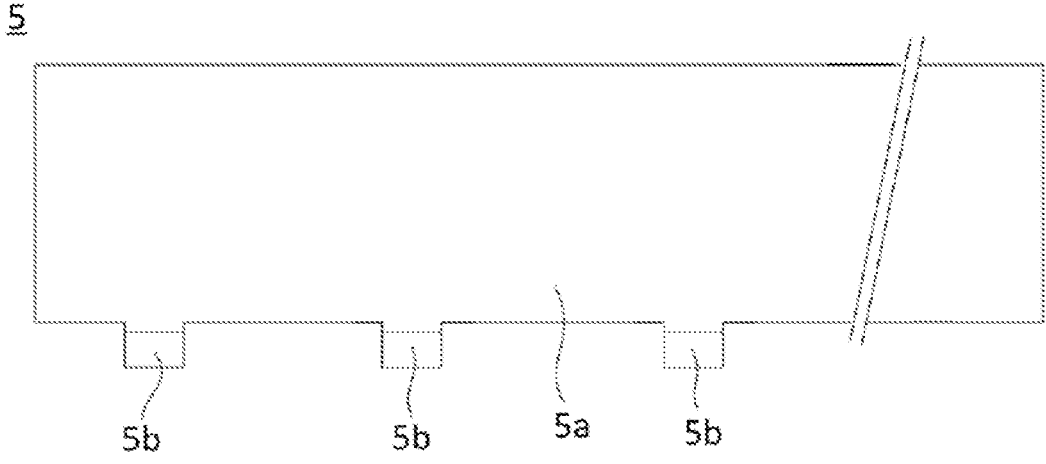
FIG. 5 is a plan view of a negative electrode plate according to the embodiment of the present disclosure.

As shown in FIG. 5, the negative electrode plate 5 has a long strip-like shape, and has a region in which a negative electrode active material layer 5a is formed on each surface of a negative electrode core (e.g., a copper foil). Multiple negative electrode tabs 5b extend in a raised shape from one end of the negative electrode core in the lateral direction of the negative electrode plate 5.

Figure 6:
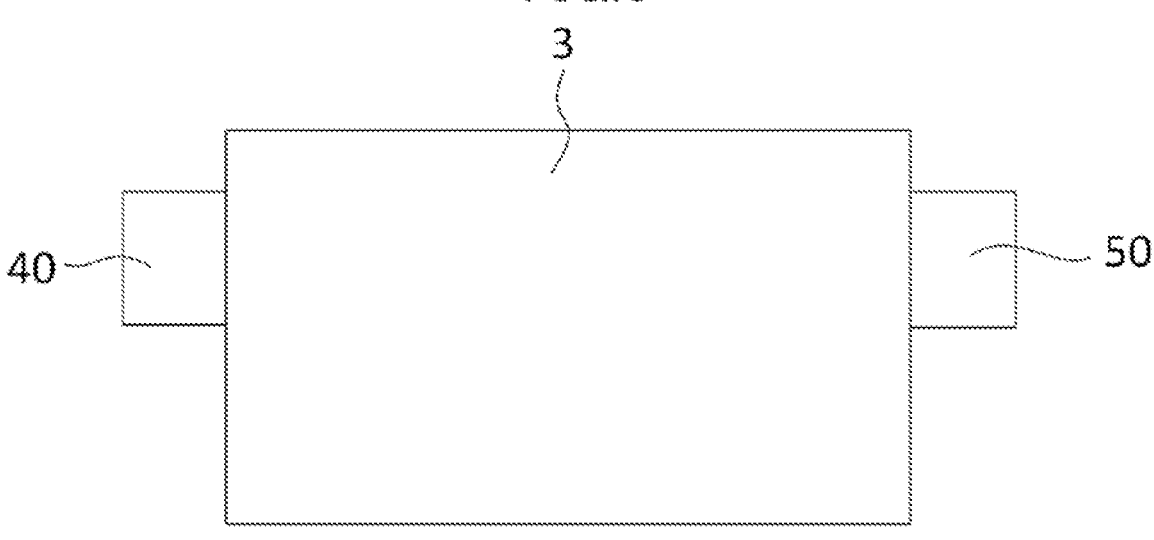
FIG. 6 is a plan view of an electrode body according to the embodiment of the present disclosure.

As shown in FIG. 6, the positive electrode plate 4 and the negative electrode plate 5 are stacked with the separator interposed therebetween and wound to form the electrode body 3. In the electrode body 3, the winding axis extends in a direction (the lateral direction in FIG. 6) connecting a positive electrode tab group 40 and a negative electrode tab group 50, and the positive electrode tab group 40 is located on one end surface of the electrode body 3 perpendicular to the winding axis and the negative electrode tab group 50 is located on the other end surface opposite to the one end surface. Such a positional relationship easily prevents or reduces short-circuit in the battery.

<Relationship Between Positive Electrode Plate and Negative Electrode Plate>

In general, batteries are designed such that an active material in a negative electrode has a greater capacity than an active material in a positive electrode in order to ensure safety and a longer life. Batteries in which a positive electrode plate and a negative electrode plate are stacked to face each other are designed such that an area of the positive electrode plate to which an active material is applied always falls within an area of the negative electrode plate to which an active material is applied and the area to which the negative electrode active material is applied is larger than (extends beyond) the area to which the positive electrode active material is applied.

Figure 7:
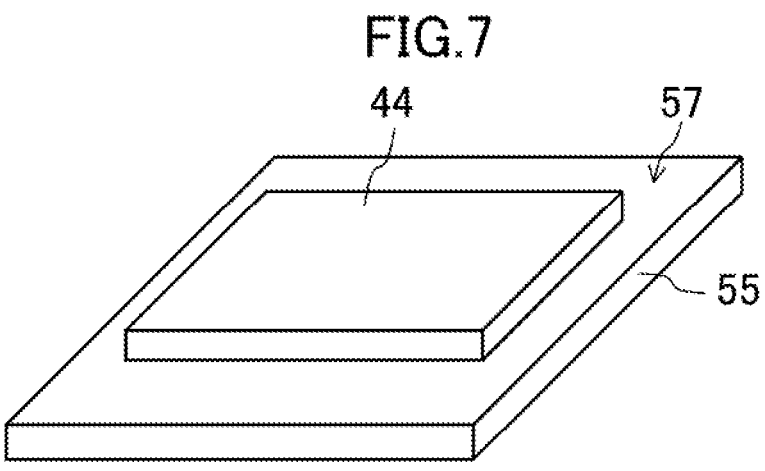
FIG. 7 is a perspective view schematically showing a positive electrode plate and a negative electrode plate of a non-aqueous electrolyte secondary battery.

FIG. 7 is a view schematically showing a positive electrode plate 44 and a negative electrode plate 55 of a non-aqueous electrolyte secondary battery. An active material is provided on the entire surface of each of the positive electrode plate 44 and the negative electrode plate 55. The area of the negative electrode plate 55 is larger than that of the positive electrode plate 44, the entire surface of the positive electrode plate 44 facing the negative electrode plate 55 faces the negative electrode plate 55, and the negative electrode plate 55 has a non-facing region 57 not facing the positive electrode plate 44.

Figure 8:
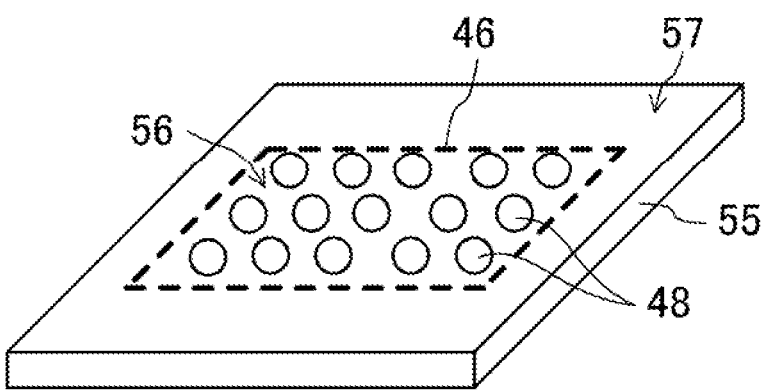
FIG. 8 is a perspective view schematically showing the state of the negative electrode plate immediately after charging without showing the positive electrode plate.

FIG. 8 schematically shows the state of the negative electrode plate 55 immediately after charging (the positive electrode plate 44 is not shown). Lithium ions 48 move from the positive electrode plate 44 to the negative electrode plate 55 by charging. The diffusion rate of the lithium ions 48 in the negative electrode plate 55 is not so high. Immediately after the charging, the lithium ions 48 are thus present only in a facing region 56 facing the positive electrode plate 44. A broken line in FIG. 8 indicates the perimeter 46 indicating the outer periphery of the positive electrode plate 44, and the facing region 56 is a region surrounded by the perimeter 46.

Figure 9:
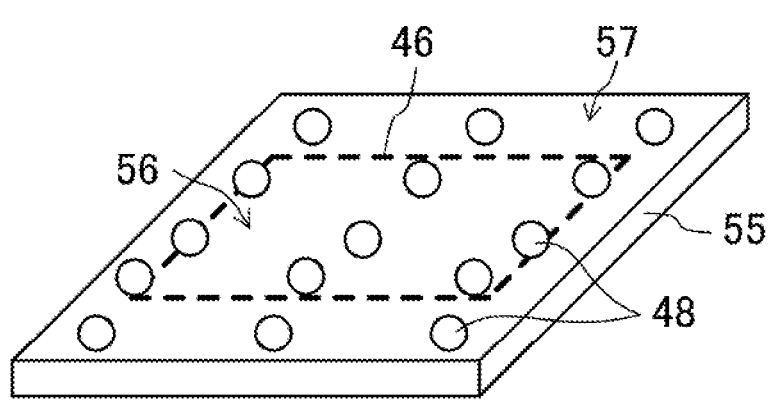
FIG. 9 is a perspective view schematically showing the state of the negative electrode plate after storage for a long period of time without discharging after charging, without showing the positive electrode plate.

If the battery is left for a long period of time without discharging after charging, the lithium ions 48 diffuse in the negative electrode plate 55 as shown in FIG. 9 (the positive electrode plate 44 is not shown), and the existence probability of the lithium ions 48 in any part of the negative electrode plate 55 becomes the same. In other words, both the facing region 56 and the non-facing region 57 have the same distribution ratio of the lithium ions 48.

Figure 10:
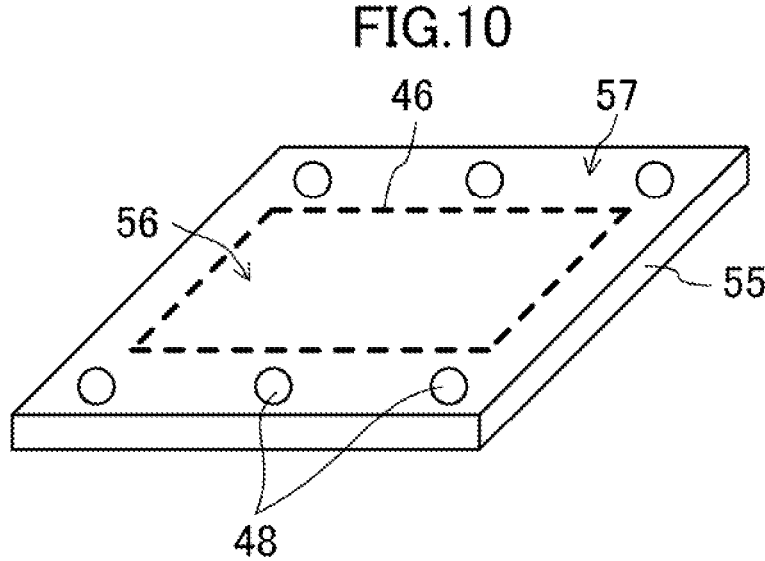
FIG. 10 is a perspective view schematically showing the state of the negative electrode plate immediately after discharging from the state of FIG. 9 without showing the positive electrode plate.
Figure 11:
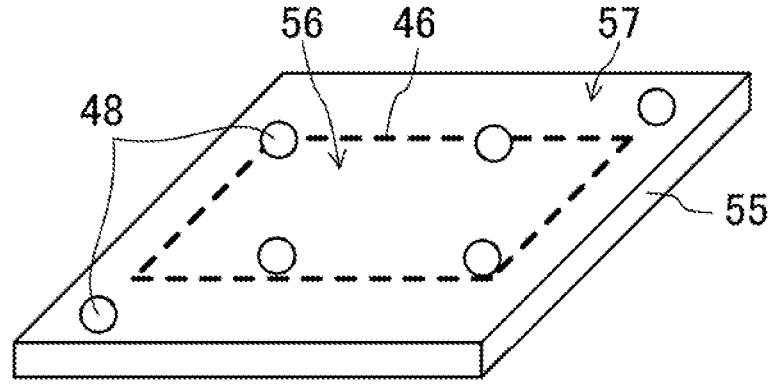
FIG. 11 is a perspective view schematically showing the state of the negative electrode plate left as it is from the state of FIG. 10, without showing the positive electrode plate.

FIG. 10 shows the state of the negative electrode plate 55 which has been left for a long period of time without discharging after charging and then has been sufficiently discharged (the positive electrode plate 44 is not shown). All the lithium ions 48 which have been present in the facing region 56 move to the positive electrode plate 44 by discharging, and the lithium ions 48 are no longer present in the facing region 56. On the other hand, the lithium ions 48 which have been present in the non-facing region 57 due to the diffusion rate of the lithium ions 48 cannot move to the positive electrode plate 44 during discharging, and thus remain in the non-facing region 57. If the battery is further left from this state without charging and discharging, some of lithium ions 48 move (diffuse) from the non-facing region 57 into the facing region 56 as shown in FIG. 11 (the positive electrode plate 44 is not shown).

From the above description, it can be understood that when the battery is left and stored after charging, the battery capacity decreases as compared to that immediately after charging. In order to reduce the decrease rate of the battery capacity and increase the capacity recovery rate, it is necessary to decrease the length of the perimeter 46 per unit battery capacity (more precisely, in the positive electrode plate, the peripheral length of a positive electrode core portion to which the positive electrode active material is applied). In other words, if the length of the perimeter 46 per unit battery capacity is short when the state of FIG. 8 shifts to the state of FIG. 9, the number of lithium ions 48 moving to the non-facing region 57 decreases, and the capacity recovery rate thus increases.

Specifically, when the peripheral length of the positive electrode core portion to which the positive electrode active material is applied is 0.28 m/Ah or less per unit battery capacity, a practically sufficient capacity recovery rate for the batteries for EVs is obtained. If the peripheral length of the positive electrode core portion to which the positive electrode active material is applied is 0.11 m/Ah or less per unit battery capacity, further improvement in capacity recovery rate can be expected. In addition, the area ratio of the facing region/(the facing region+the non-facing region) in the negative electrode plate 55 is 85% or more to 95% or less. The area ratio of the facing region/(the facing region+the non-facing region) is, more precisely, the ratio of an area of a portion to which the negative electrode active material is applied and which faces the portion to which the positive electrode active material is applied, to the total area of the portion to which the negative electrode active material is applied. When the peripheral length of the portion to which the positive electrode active material is applied per unit capacity of the present disclosure is satisfied and the area ratio of the facing region/(the facing region+the non-facing region) in the negative electrode plate 55 is 85% or more to 95% or less, a region in which lithium ions are dispersed while the battery is left for a long period of time as shown in FIG. 9 can be reduced, and the capacity recovery rate can be improved.

The capacity per electrode body is preferably 30 Ah or more. The battery capacity per unit area of the positive electrode core portion to which the positive electrode active material is applied is 40 Ah/m$^2$ or more in a preferred embodiment. The improvement in the capacity recovery rate, which is an object of the present disclosure, is particularly required in lithium ion batteries for EVs. Furthermore, in these batteries, the above-described configuration improves an energy density, which leads to extension of an EV travelling distance.

Patent Document 1 discloses a battery in which a battery capacity is 8.4 Ah, the width of a portion to which a positive electrode active material is applied is 11.0 cm, and the length of a positive electrode plate is 440 cm. In this battery, the peripheral length of the portion to which the positive electrode active material is applied per unit capacity is 1.07 m/Ah. Patent Document 2 discloses a battery in which a battery capacity is 4.6 Ah, the width of a portion to which a positive electrode active material is applied is 50 mm, and the length of a positive electrode plate is 3000 mm. In this battery, the peripheral length of the portion to which the positive electrode active material is applied per unit capacity is 1.33 m/Ah.

<Structure of Current Collection from Electrode Body>

The sealing plate 2 is provided with the positive electrode terminal 8 and the negative electrode terminal 9 as electrode terminals to the outside. The positive electrode terminal 8 is electrically connected to the positive electrode tab group 40 with the positive electrode current collector 6 interposed therebetween. The positive electrode current collector 6 includes a first positive electrode current collector 61 and a second positive electrode current collector 62. The negative electrode terminal 9 is electrically connected to the negative electrode tab group 50 with the negative electrode current collector 7 interposed therebetween. The negative electrode current collector 7 includes a first negative electrode current collector 71 and a second negative electrode current collector 72.

The first positive electrode current collector 61 has a substantially L-shaped cross section and is disposed between the electrode body 3 and the sealing plate 2. Specifically, the first positive electrode current collector 61 has a first region disposed along the sealing plate 2 and a second region bent from an end of the first region. The second region extends along the first side wall 1b toward the bottom 1a. The first positive electrode current collector 61 is in connection with the positive electrode terminal 8. The negative electrode side has a similar configuration.

The second positive electrode current collector 62 is disposed between the electrode body 3 and the first side wall 1b of the rectangular exterior body 1. Specifically, the second positive electrode current collector 62 is made of a flat plate having a surface parallel to the first side wall 1b, and extends along the first side wall 1b toward the bottom 1a. The second positive electrode current collector 62 is in connection with the first positive electrode current collector 61. The negative electrode side has a similar configuration.

Figure 3:
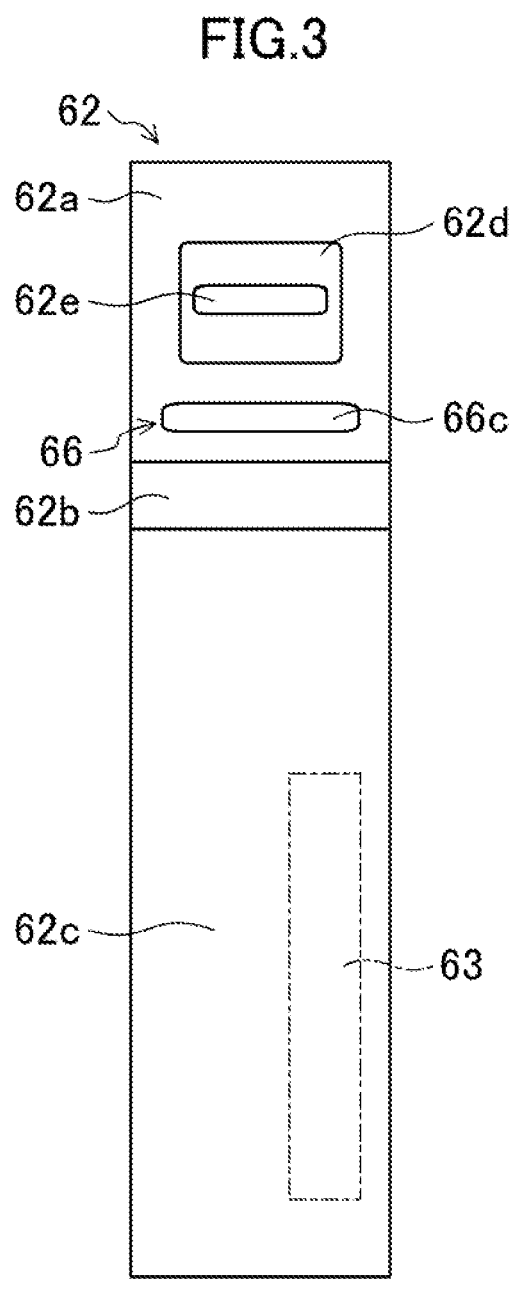

FIG. 3 shows the second positive electrode current collector 62. The second positive electrode current collector 62 has a structure in which a substantially rectangular flat plate is partially bent, and includes a current collector connector 62a, an inclined portion 62b, and a tab connector 62c. The current collector connector 62a is connected to the first positive electrode current collector 61. The positive electrode tab group 40 is connected to the tab connector 62c. The inclined portion 62b connects the current collector connector 62a and the tab connector 62c, and is inclined with respect to both of these connectors.

The current collector connector 62a is provided with a recess 62d. The recess 62d has a through hole 62e. In the recess 62d, the current collector connector 62a is joined to the first positive electrode current collector 61. The second positive electrode current collector 62 is further provided with a fuse 66.

Figure 12:
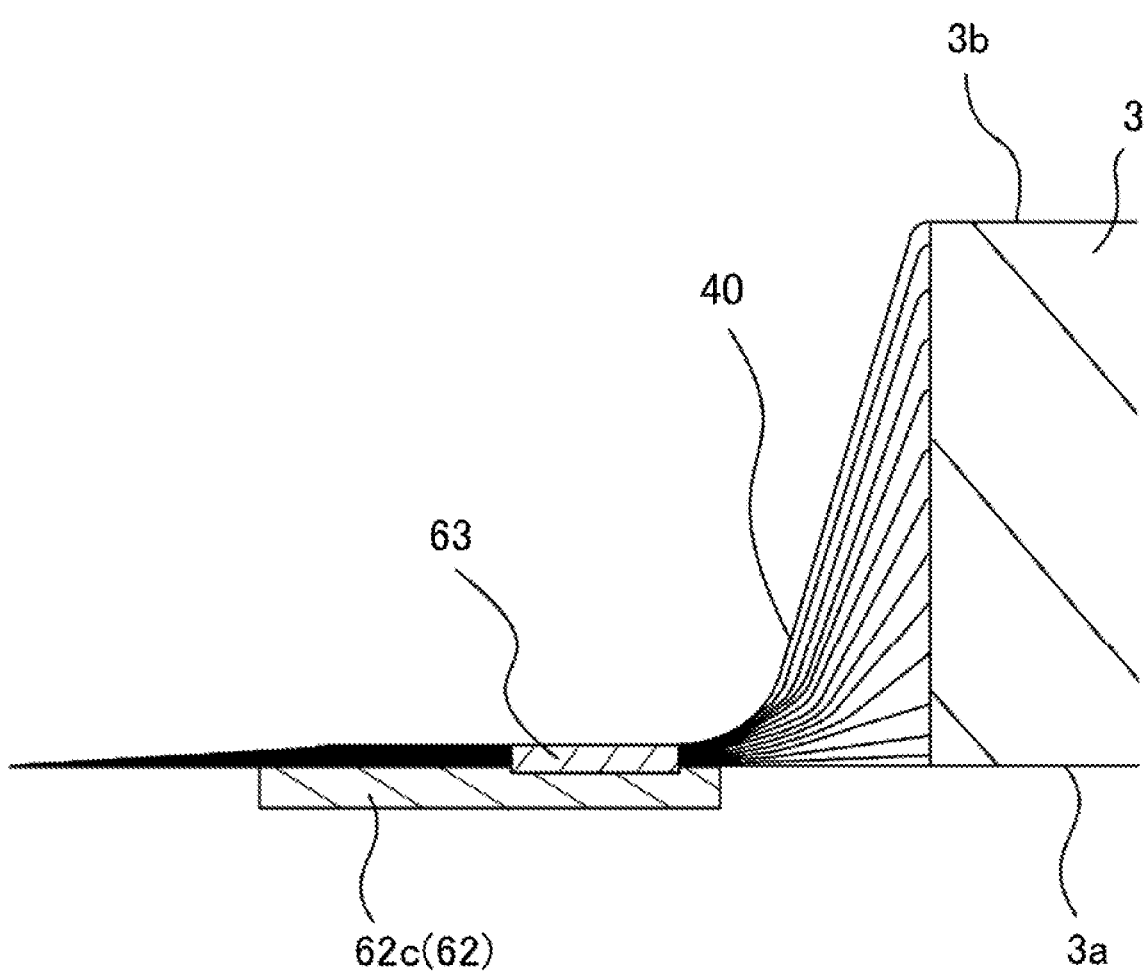
FIG. 12 shows the vicinity of a connection between a second current collector and a tab group before bending the tab group.
Figure 14:
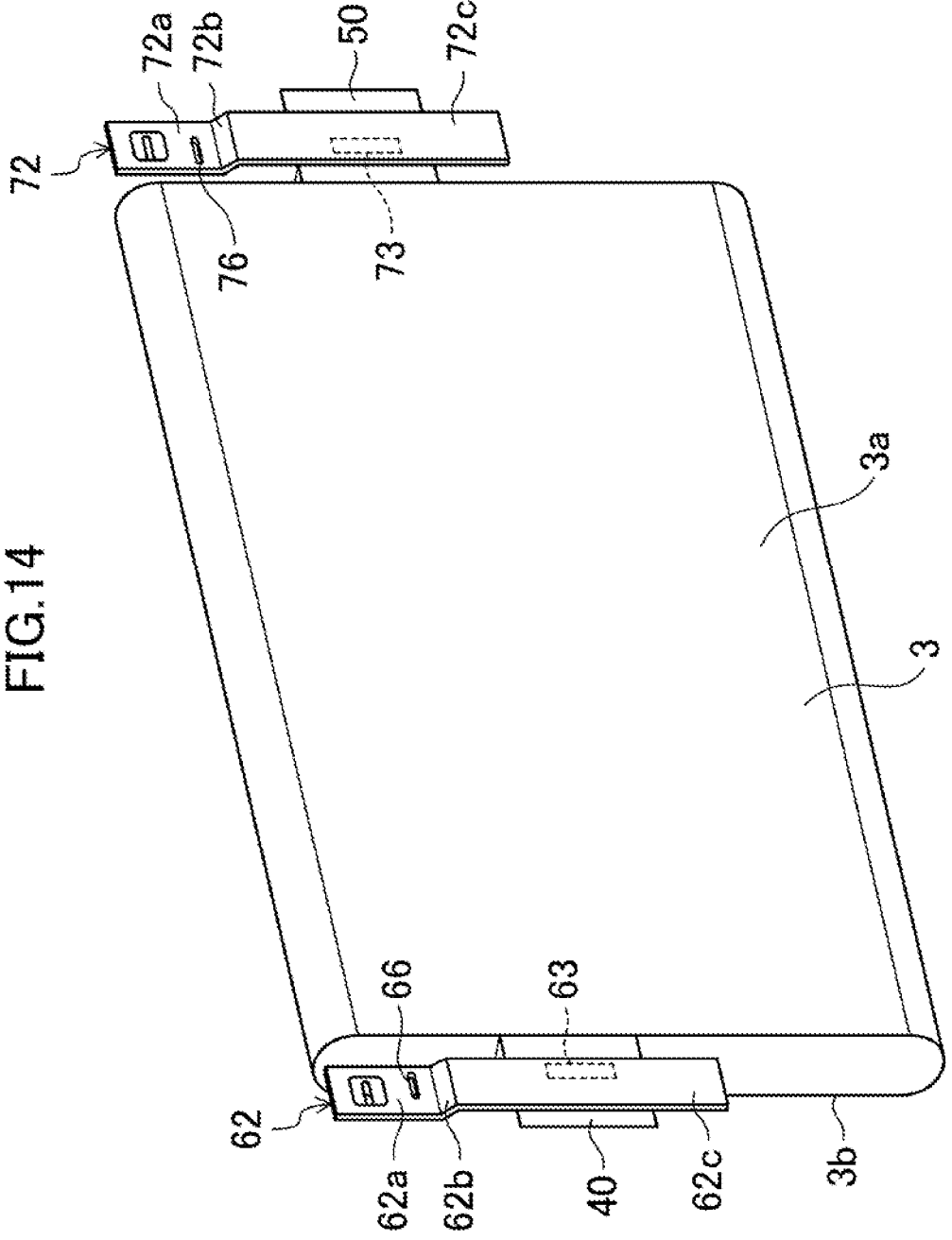
FIG. 14 is a perspective view showing an electrode body where tab groups are connected to second current collectors before bending the tab groups.

Next, bending of the positive electrode tab group 40 and connection between the positive electrode tab group 40 and the second positive electrode current collector 62 are described. The negative electrode side has substantially the same configuration and structure as the positive electrode side. Thus, only the positive electrode side is described below. FIG. 12 shows the vicinity of the connection between the second positive electrode current collector 62 and the positive electrode tab group 40 before bending the positive electrode tab group 40. FIG. 14 shows an electrode body 3 in which the positive electrode tab group 40 is connected to the second positive electrode current collector 62 and the negative electrode tab group 50 is connected to the second negative electrode current collector 72 before bending the positive electrode tab group 40 and the negative electrode tab group 50.

The positive electrode tab group 40 is connected to the tab connector 62c in the second positive electrode current collector 62. Specifically, as shown in FIG. 12, the tab connector 62c and the positive electrode tab group 40 are joined (welded) with the positive electrode tab group 40 disposed on the tab connector 62c in the second positive electrode current collector 62 before bending the positive electrode tab group 40, thereby forming a connection 63.

Here, as shown in FIG. 12, the positive electrode tab group 40 is in connection with the tab connector 62c of the second positive electrode current collector 62 on one side (the right side in FIG. 12) in the width direction of the flat plate forming the second positive electrode current collector 62. In other words, the connection 63 between the positive electrode tab group 40 and the tab connector 62c is closer to the base (one side in the width direction, the right side in FIG. 9) of the positive electrode tab group 40 in the width direction of the flat plate. Accordingly, when the positive electrode tab group 40 is bent, a curved shape can be more reliably formed in the vicinity of the base of the positive electrode tab group 40 in a stable manner.

Figure 13:
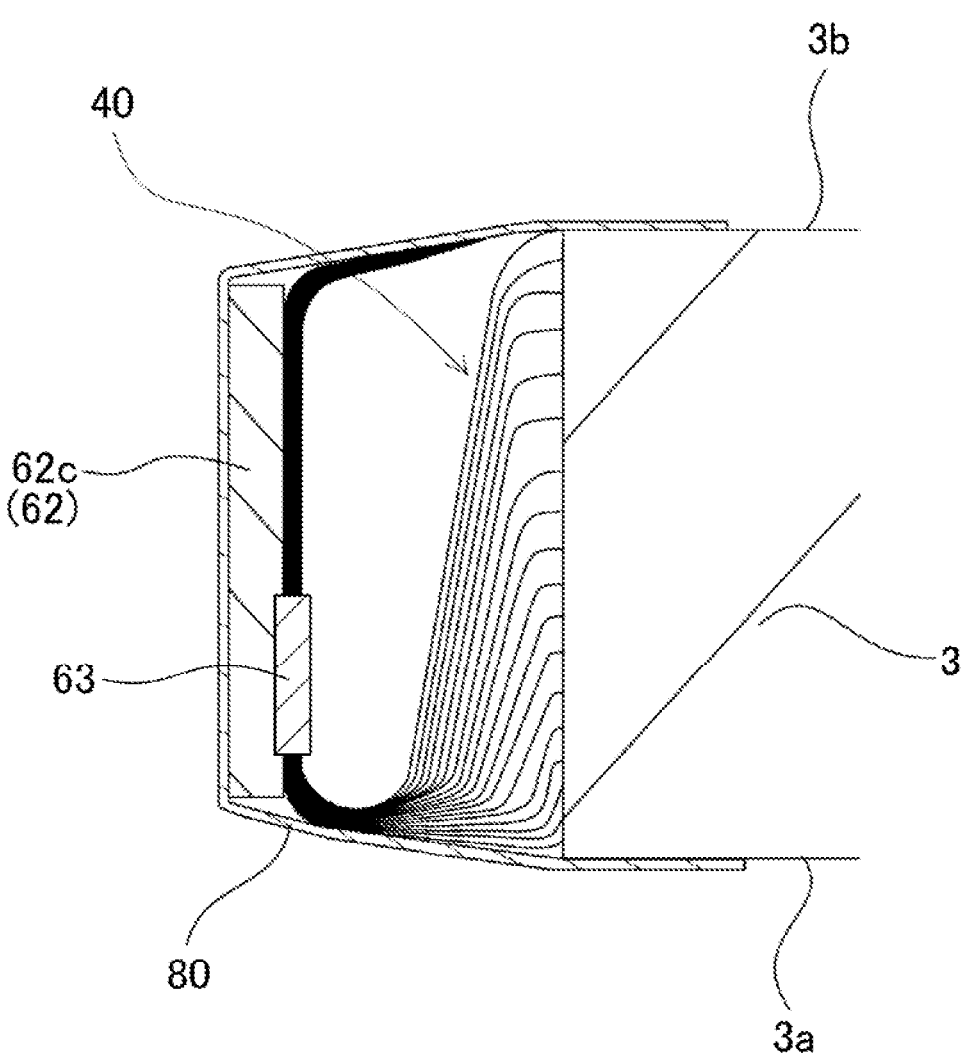
FIG. 13 is a view showing the vicinity of the connection between the second current collector and the tab group after bending the tab group.

FIG. 13 is a view showing the vicinity of the connection between the second positive electrode current collector 62 and the positive electrode tab group 40 after bending the positive electrode tab group 40. The positive electrode tab group 40 is bent so that the tab connector 62c of the second positive electrode current collector 62 disposed substantially parallel to the first main surface 3a and the second main surface 3b of the electrode body 3 (see FIGS. 12 and 14) is oriented substantially perpendicularly to the winding axis of the electrode body 3. Specifically, the positive electrode tab group 40 is bent on a side close to the connection 63 with the second positive electrode current collector 62 to be parallel to the first side wall 1b. The bent positive electrode tab group 40 is fixed to the electrode body 3 with a tape 80.

With such a configuration, the positive electrode tab group 40 can be bent without bending the second positive electrode current collector 62. This enables manufacturing of non-aqueous electrolyte secondary batteries with a high volumetric energy density by a simple method.

As described above, the negative electrode side has a configuration similar to that of the positive electrode side, and in FIG. 14, reference numeral 72a denotes a current collector connector, reference numeral 72b denotes an inclined portion, and reference numeral 72c denotes a tab connector.

In the non-aqueous electrolyte secondary battery according to the present embodiment, the positive electrode tab group 40 and the negative electrode tab group 50 are bent, which allows the battery to have a high volumetric energy density without bending the second current collectors 62 and 72. One end of the negative electrode plate 5 is disposed to face the protective layer 4c on the positive electrode plate 4, thereby substantially preventing or reducing short-circuit in the battery.

EXAMPLES

Example 1

[Production of Positive Electrode Plate]

Lithium nickel cobalt manganese composite oxide as a positive electrode active material, polyvinylidene fluoride (PVdF) as a binder, a carbon material as an electroconductive material, and N-methyl-2-pyrrolidone (NMP) as a dispersion medium were kneaded at a mass ratio of lithium nickel cobalt manganese composite oxide:PVdF:carbon material of 97.5:1:1.5. Thus, a positive electrode active material layer slurry was prepared.

An alumina powder, a carbon material as an electroconductive material, polyvinylidene fluoride (PVdF) as a binder, and N-methyl-2-pyrrolidone (NMP) as a dispersion medium were kneaded at a mass ratio of alumina powder: carbon material:PVdF of 83:3:14. Thus, a protective layer slurry was prepared.

To both surfaces of an aluminum foil as a positive electrode core, the positive electrode active material layer slurry and the positive electrode protective layer slurry produced as described above were applied using a die coater. At this time, the positive electrode active material layer slurry was applied to the center of the positive electrode core in a width direction thereof. Further, the positive electrode protective layer slurry was applied to ends of the region, to which the positive electrode active material layer slurry is applied, in a width direction thereof.

The positive electrode core with the positive electrode active material layer slurry and the positive electrode protective layer slurry applied thereon was dried to remove NMP contained in the positive electrode active material layer slurry and the positive electrode protective layer slurry. Accordingly, a positive electrode active material layer and a positive electrode protective layer were formed. Then, the positive electrode active material layer was compressed, thereby obtaining a positive electrode original plate. The positive electrode original plate was cut so that the portion to which the active material layer is applied has a rectangular shape with a width of 88 mm and a length of 4600 mm. Thus, a positive electrode plate was obtained. The cutting of the positive electrode original plate could be performed by irradiation with energy rays such as a laser, a die, a cutter, or the like.

[Production of Negative Electrode Plate]

Graphite as a negative electrode active material, styrene-butadiene rubber (SBR) and carboxymethyl cellulose (CMC) as a binder, and water as a dispersion medium were kneaded at a mass ratio of graphite:SBR:CMC of 98:1:1. Thus, a negative electrode active material layer slurry was prepared.

To both surfaces of a copper foil as a negative electrode core, the negative electrode active material layer slurry produced as described above was applied using a die coater. The negative electrode core with the negative electrode active material layer slurry applied thereon was dried to remove water contained in the negative electrode active material layer slurry. In this way, a negative electrode active material layer was formed. Thereafter, the negative electrode active material layer was compressed, thereby obtaining a negative electrode original plate. The negative electrode original plate was cut so that the portion to which the active material layer was applied had a width of 92 mm and a length of 4900 mm. Thus, a negative electrode plate was obtained. The cutting of the negative electrode original plate could be performed by irradiation with energy rays such as a laser, a die, a cutter, or the like.

[Production of Electrode Body]

The strip-like positive electrode plate and the strip-like negative electrode plate produced in the manner described above were wound with a strip-like polyolefin separator interposed therebetween, thereby producing a flat wound electrode body. The electrode body has a flat region at the center and curved portions at both ends of the flat region. A positive electrode tab group in which multiple positive electrode tabs are stacked is provided at one end of the electrode body in the direction in which the winding axis extends. A negative electrode tab group in which multiple negative electrode tabs are stacked is provided at the other end of the electrode body in the direction in which the winding axis extends. In the direction perpendicular to the direction in which the winding axis of the electrode body extends and perpendicular to the thickness direction of the electrode body, the center of the positive electrode tab group and the center of the negative electrode tab group are positioned to be shifted to one side from the winding axis.

[Production of Battery]

Figure 15:
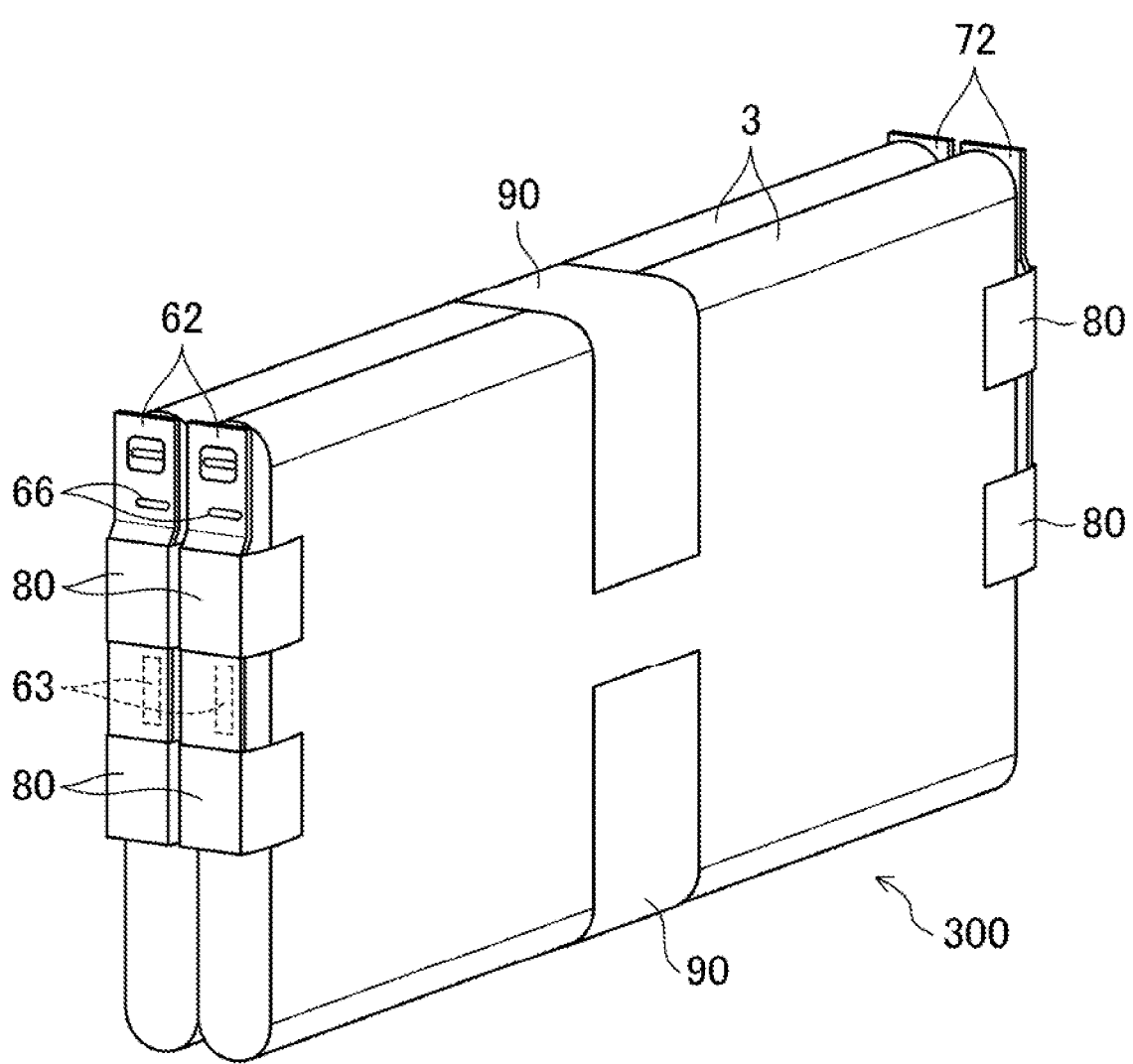
FIG. 15 is a view showing an electrode body group including multiple electrode bodies.
Figure 16:
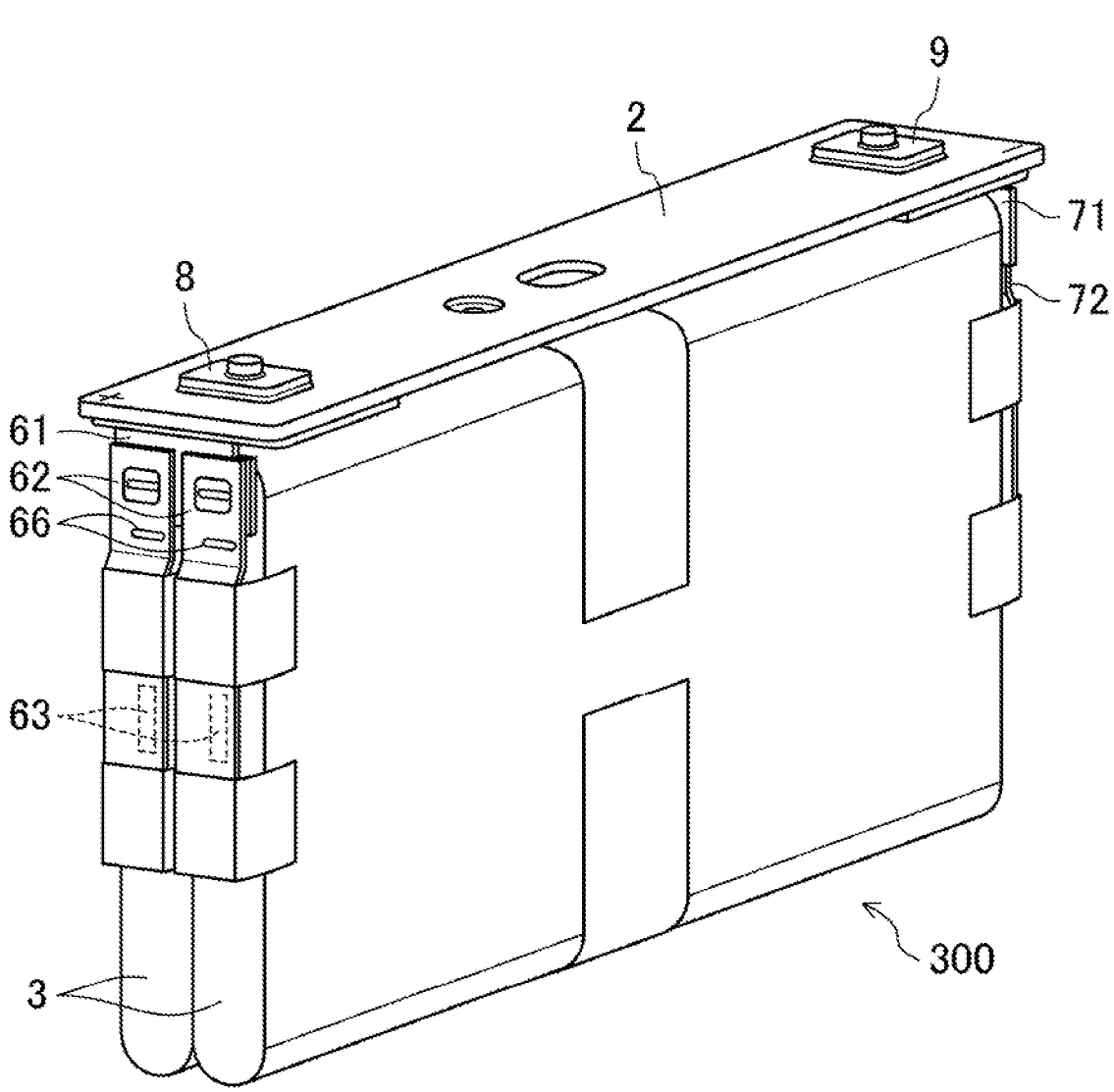
FIG. 16 is a view showing an electrode body group and a sealing plate connected to each other with a first current collector and second current collectors.

As shown in FIG. 14, a second positive electrode current collector 62 was joined to the positive electrode tab group 40, and a second negative electrode current collector 72 was joined to the negative electrode tab group 50. Further, as shown in FIGS. 15 and 16, two electrode bodies 3 with the positive electrode tab group 40 and the negative electrode tab group 50 bent in each electrode body 3 were stacked and fixed by a tape 90. The positive electrode tab groups 40 are located on the same side, and the negative electrode tab groups 50 are located on the same side. Among the electrode bodies 3, the positive electrode tab groups 40 are bent in the same direction. Among the electrode bodies 3, the negative electrode tab groups 50 are bent in the same direction.

In the direction in which the electrode bodies 3 are stacked, the second positive electrode current collectors 62 each attached to the electrode bodies 3 are arranged at an interval and connected to the second region 61b of the first positive electrode current collector 61. The same applies to the second negative electrode current collectors 72.

These two electrode bodies 3 were inserted into a rectangular exterior body 1. Then, a sealing plate 2 was joined to the rectangular exterior body 1, thereby sealing the opening of the rectangular exterior body 1 with the sealing plate 2. An electrolyte was then injected from an electrolyte injection hole 15 provided in the sealing plate 2, and the electrolyte injection hole 15 was sealed with a sealing member 16. Thus, a non-aqueous electrolyte secondary battery 20 was obtained.

[Initial Charging-Discharging Conditions]

The produced non-aqueous electrolyte secondary battery was charged and discharged at 0.5 C and adjusted to have an SOC of 20% or less, and accordingly, was ready for shipping. This battery was taken as a battery of Example 1.

[High Temperature Storage Test Conditions]

Assuming that the time point when the SOC of the non-aqueous electrolyte secondary battery which is ready for shipping reached 90% by charging is defined as 0 days of storage, the discharge capacities of the non-aqueous electrolyte secondary battery after a lapse of 56 days and 300 days of storage under 60° C. environment were checked. The ratio of each discharge capacity with respect to 100% of the discharge capacity before storage was defined as the capacity recovery rate after storage.

Example 2

A battery was produced in a manner similar to that in Example 1, except that in one electrode body, a positive electrode plate portion to which an active material layer was applied had a width of 262 mm and a length of 2900 mm and a negative electrode plate portion to which an active material layer was applied had a width of 272 mm and a length of 3100 mm. The battery was subjected to a high temperature storage test. This battery was taken as a battery of Example 2.

Comparative Example

A battery was produced in a manner similar to those in Examples 1 and 2, except that in one electrode body, a positive electrode plate portion to which an active material layer was applied had a width of 76 mm and a length of 4600 mm and a negative electrode plate portion to which an active material layer was applied had a width of 80 mm and a length of 4900 mm. The battery was subjected to a high temperature storage test. This battery was taken as a battery of Comparative Example.

Hereinafter, Examples of the present disclosure will be described in detail with reference to Table 1.

The non-aqueous electrolyte secondary battery 20 may include multiple electrode bodies 3. In this case, the capacity per electrode body is 30 Ah or more in a preferred embodiment. FIG. 15 is a view showing an electrode body group 300 including multiple electrode bodies 3. As shown in FIG. 15, the non-aqueous electrolyte secondary battery 20 includes the multiple (two) electrode bodies 3. A second current collector 62 is connected to a positive electrode tab

TABLE I

|  | Example 1 | Example 2 | Comparative example |
|---|---|---|---|
| Peripheral length of portion to which positive electrode active material is applied per unit battery capacity | 0.280 m/Ah | 0.101 m/Ah | 0.322 m/Ah |
| Ratio of area of portion facing portion to which positive electrode active material is applied, to total area of portion to which negative electrode active material is applied. | 89.8% | 90.1% | 89.2% |
| Capacity per electrode body | 33.5 Ah | 62.8 Ah | 29.0 Ah |
| Capacity per unit area of portion to which positive electrode active material is applied | 41.4 Ah/m$^2$ | 41.3 Ah/m$^2$ | 41.5 Ah/m$^2$ |
| Storage days | Capacity recovery rate | | |
| 0 days | 100% | 100% | 100% |
| 56 days | 91% | 94% | 90% |
| 300 days | 80% | 86% | 78% |

Table 1 shows, for the non-aqueous electrolyte secondary batteries of Example 1, Example 2, and Comparative Example, the peripheral length of the portion to which the positive electrode active material was applied per unit battery capacity, the ratio of the area of the portion, to which the negative electrode active material was applied, facing the portion to which the positive electrode active material was applied to the entire area of the portion to which the negative electrode active material was applied, the capacity per electrode body, the capacity per unit area of the portion to which the positive electrode active material was applied, and the capacity recovery rate after the high temperature storage test.

It was found that when the peripheral length of the portion to which the positive electrode active material was applied per unit battery capacity was 0.28 m/Ah or less as in Example 1, a capacity recovery rate of 80% could be maintained even after storage for 300 days. A capacity recovery rate of over 80% after storage for 300 days in 60° C. environment is considered to be suitable for batteries for EVs. It was found that when the peripheral length of the portion to which the positive electrode active material was applied per unit battery capacity was 0.11 m/Ah or less as in Example 2, a capacity recovery rate of 86% could be maintained even after storage for 300 days. This showed further improvement in storage resistance.

In contrast, when the peripheral length of the portion to which the positive electrode active material was applied per unit battery capacity was 0.28 m/Ah or more as in Comparative Example, the capacity recovery rate after storage for 300 days decreased to 78%, which does not satisfy the performance level required for batteries for EVs.

OTHER EMBODIMENTS

The above embodiment is a mere example of the present invention. The present invention is not limited to this example. Instead, the present invention may be a combination of a well-known art, a typical technique, and a publicly-known technique with the example, and may also have a part of the example replaced. Further, the present invention encompasses any modification easily conceivable by a person skilled in the art.

group 40 of each electrode body 3. The multiple electrode bodies 3 and 3 are arranged and fixed together with a tape 90 to form the electrode body group 300. FIG. 16 is a view showing an electrode body group 300 and a sealing plate 2 connected to each other by a first positive electrode current collector 61 and second positive electrode current collectors 62.

DESCRIPTION OF REFERENCE CHARACTERS

1 Rectangular Exterior Body
1b First Side Wall (Side Wall)
1c First Side Wall (Side Wall)
2 Sealing Plate
3 Electrode Body
4 Positive Electrode Plate
4b Positive Electrode Tab
5 Negative Electrode Plate
5b Negative Electrode Tab
8 Positive Electrode Terminal (Electrode Terminal)
9 Negative Electrode Terminal (Electrode Terminal)
20 Non-Aqueous Electrolyte Secondary Battery
40 Positive Electrode Tab Group (Tab Group)
50 Negative Electrode Tab Group (Tab Group)
61 First Positive Electrode Current Collector (First Current Collector)
62 Second Positive Electrode Current Collector (Second Current Collector)
71 First Negative Electrode Current Collector (First Current Collector)
72 Second Negative Electrode Current Collector (Second Current Collector)

The invention claimed is:

1. A non-aqueous electrolyte secondary battery comprising:

an electrode body including a positive electrode plate and a negative electrode plate;

a rectangular exterior body having an opening and accommodating the electrode body;

a sealing plate sealing the opening; and an electrode terminal provided to the sealing plate, the positive electrode plate including a positive electrode core and a positive electrode active material applied to at least one surface of the positive electrode core, a peripheral length of a positive electrode core portion to which the positive electrode active material being applied is 0.11 m/Ah or less per unit battery capacity, wherein a protective layer is provided directly on one end of the positive electrode plate extending in a longitudinal direction of the positive electrode plate toward a longitudinal center axis of the positive electrode plate at a constant width, wherein the negative electrode plate includes a negative electrode core and a negative electrode active material applied to the negative electrode core, the positive electrode plate and the negative electrode plate in the electrode body are stacked with a separator interposed therebetween, and an area of a portion, which faces the portion to which the positive electrode active material is applied, of a negative electrode plate portion to which the negative electrode active material is applied is 85% or more to 95% or less of an entire area of the portion to which the negative electrode active material is applied.

2. The non-aqueous electrolyte secondary battery of claim 1, wherein the electrode body has a shape in which the positive electrode plate and the negative electrode plate are wound to face each other.

3. The non-aqueous electrolyte secondary battery of claim 1, wherein the electrode body includes one or more electrode bodies, and a capacity of each electrode body is 30 Ah or more.

4. The non-aqueous electrolyte secondary battery of claim 1, wherein a battery capacity per unit area of the positive electrode core portion to which the positive electrode active material is applied is 40 Ah/m$^2$ or more.

5. The non-aqueous electrolyte secondary battery of claim 1, further comprising:

a first current collector disposed between the electrode body and the sealing plate and connected to the electrode terminal;

a second current collector disposed between the electrode body and a side wall of the rectangular exterior body and connected to the first current collector; and a tab group extending from the electrode body toward the side wall and connected to the second current collector, wherein the second current collector is made of a flat plate having a surface parallel to the side wall, and the tab group includes a positive electrode tab group with a bundle of multiple positive electrode tabs extending from the positive electrode plate and a negative electrode tab group with a bundle of multiple negative electrode tabs extending from the negative electrode plate, and is bent on a side close to a connection with the second current collector to be parallel to the side wall.

6. The non-aqueous electrolyte secondary battery of claim 1, wherein the electrode body includes one or more electrode bodies, and a capacity of each electrode body is 33.5 Ah to 62.8 Ah.

* * * * *